(12) United States Patent
Blackwood et al.

(10) Patent No.: US 9,555,750 B2
(45) Date of Patent: Jan. 31, 2017

(54) SELF-IDENTIFYING SWITCH SYSTEM FOR VEHICLE CONTROL

(71) Applicant: Eaton Corporation, Cleveland, OH (US)

(72) Inventors: Andrew James Blackwood, Waukesha, WI (US); David Mark Nelsen, Mequon, WI (US); Richard William Fitzgerald, Franklin, WI (US)

(73) Assignee: Eaton Corporation, Cleveland, OH (US)

( * ) Notice: Subject to any disclaimer, the term of this patent is extended or adjusted under 35 U.S.C. 154(b) by 559 days.

(21) Appl. No.: 14/054,224

(22) Filed: Oct. 15, 2013

(65) Prior Publication Data

US 2015/0102665 A1 Apr. 16, 2015

(51) Int. Cl.
*B60R 16/023* (2006.01)
*B60R 16/00* (2006.01)

(52) U.S. Cl.
CPC ........... *B60R 16/023* (2013.01); *B60R 16/005* (2013.01)

(58) Field of Classification Search
CPC .................................................. B60R 16/023
USPC ....................................................... 307/10.1
See application file for complete search history.

(56) References Cited

U.S. PATENT DOCUMENTS 5,081,586 A * 1/1992 Barthel ............... B60R 16/0315
307/10.1
5,491,383 A 2/1996 Leiber et al.
6,635,972 B1 10/2003 Barthel et al.
2004/0217649 A1 11/2004 Rouleau

FOREIGN PATENT DOCUMENTS

WO 2009145678 A1 12/2009

OTHER PUBLICATIONS

International Search Report and Written Opinion from corresponding PCT/US2014/059598, dated Jan. 16, 2015.

* cited by examiner

*Primary Examiner* — Jared Fureman
*Assistant Examiner* — James Evans
(74) *Attorney, Agent, or Firm* — Ziolkowski Patent Solutions Group, SC (57) ABSTRACT

A vehicle switch module includes a sub-network having switches connected thereto and a sub-network controller in operative communication with the sub-network and the switches. Each switch includes a microprocessor programmed to generate switch messages that include address and switch logic state data. The sub-network controller transmits switch queries onto the sub-network to a number of switch addresses to determine a connection status and switch state of switches in the switch module and receives switch messages responsive to the queries from switches at addresses to which the switch queries were transmitted. The received switch messages verify the identity of a switch in the module and provide a switch state for the switch. The sub-network controller interprets the received switch messages and—based on the switch address and switch state data in the messages—controls operation of a vehicle output or load associated with each of the switches.

20 Claims, 6 Drawing Sheets

SELF-IDENTIFYING SWITCH SYSTEM FOR VEHICLE CONTROL

BACKGROUND OF THE INVENTION

The present invention relates generally to electrical switches for use in motor vehicles and, more particularly, to a system and method for providing a vehicle switch module having a self-identifying switch function. The switch module enables the placement of switches in any of a number of locations consistent with a customer's desired switch customization requirement, while providing for the identification of a switch regardless of its location, such that switches can be placed in any position within a defined network on the vehicle without changing the switch's functionality or the system wiring.

Electrical switches are used in motor vehicles as control switches for switching the motor vehicle lighting, the windshield wipers, the rear windshield heating, the cruise control functions, the internal central locking and other functions on and off. A number of such switches can be combined as control panels in the dashboard, in the center console or the like. In specialty vehicle markets—such as heavy trucks, agricultural equipment, and construction equipment, for example—many original equipment manufacturers (OEMs) produce custom dashboards for their customers. In doing so, the OEMs allow the customers to pick options as well as their associated switch locations. While such customization is desirable from the standpoint of the customer, such customization leads to significant overhead expenses for the OEMs with respect to managing customer options for the dashboards. That is, present methods of managing production for customer dashboards having customized options and associated switch locations requires separate drawings and wire harnesses for every vehicle manufactured. Furthermore, some OEMs may even install the wires for every option sold, but only connect the wires used with the individual customer dashboard order.

In the mix of switch functions, some switches provide input signals to a vehicle's microprocessor-based controller, often referred to as a body controller, or electronic controller unit (ECU), which receives the signal and makes logic decisions regarding how that function is to be performed or activated. Other switches are wired directly to their intended loads. Those switches providing ECU input typically operate at very low current, typically in the range of 5 to 20 milliAmperes (mA), whereas direct-wired switches may handle loads up to 20 Amperes or more. Different contact materials are needed to accommodate these varying load ranges, as well as different sized wires and connectors. The arrangement or rearrangement of switches within the dashboard array is often limited in practice by the ability of the OEM to provide appropriate high current and low current wiring to support the desired functions. It is also common for OEMs to provide the same type of electrical connector and wires for all switch positions for economy and standardization, though the practice can result in a higher percentage of wiring errors at the time the vehicle is being assembled.

It would therefore be desirable to design a system and method that enables OEMs to reduce the cost of managing a custom dashboard. In doing so, the system and method would allow for one vehicle harness that could handle multiple customer options—thereby enabling vehicle OEMs to significantly reduce the engineering overhead and the wire count associated with a custom dashboard. It would also be desirable to provide a system where the user interface switch—particularly for direct-wired loads—may be located remotely from the direct-wired connection point, allowing for more standardized wiring layouts.

BRIEF DESCRIPTION OF THE INVENTION

Embodiments of the present invention provide a vehicle switch module, and method of operating thereof, that provides a self-identifying switch function. The switch module enables the placement of switches in any of a number of locations consistent with a customer's desired switch customization requirement, while providing for the identification of a switch regardless of its location, such that switches can be placed in any position within a defined network on the vehicle without changing the switch's functionality or the system wiring.

In accordance with one aspect of the invention, an electrical switch module for use in a motor vehicle includes a backplane includes a plurality of connections thereon and a communications sub-network, a sub-network controller in operative communication with the communications sub-network, and a plurality of electrical switches coupled to the plurality of connections on the backplane so as to be in operative communication with the communications sub-network, each of the plurality of electrical switches including a microprocessor therein programmed to generate switch messages that include therein data regarding an address associated with the switch and a switch logic state. The sub-network controller is programmed to transmit switch queries onto the communications sub-network to each of a plurality of switch addresses to determine a connection status and switch state of the plurality of electrical switches and receive switch messages responsive to the switch queries from switches at the switch addresses to which the switch queries were transmitted, with each of the received switch messages verifying the presence of a switch in the switch module and providing a switch state for the respective switch. The sub-network controller is further programmed to interpret the received switch messages to perform at least one of transmitting the switch messages onto a vehicle communications network to which the switch module is in operative communication, for purposes of controlling vehicle outputs associated with the switch messages and controlling operation of one or more solid state outputs or relays associated with the switches from which the switch messages are provided.

In accordance with another aspect of the invention, a method of identifying and transmitting switch messages to and from a switch module in a vehicle communication system includes associating a switch ID with each of a plurality of switches included in a vehicle communication system and identifying the switch ID of all switches included in a switch module in the vehicle communication system, such that each switch included in the switch module is identified by its switch ID. The method also includes identifying a switch state of all switches included in the switch module and controlling operation of a vehicle output or load associated with each of the plurality of switches based on the identified switch IDs and their associated switch states. The steps of identifying the switch ID and the switch state of switches included in the switch module further includes causing a sub-network controller of the switch module to transmit switch queries onto a sub-network of the switch module to each of a plurality of switch addresses, receiving at the sub-network controller switch messages from any switches on the sub-network that are associated with the switch IDs to which the switch queries were transmitted, and identifying the switch ID and the switch state of all switches in the switch module based on the received switch messages.

In accordance with yet another aspect of the invention, a switch module sub-network controller for enabling vehicular communication between switches in a switch module and loads associated with the switches is provided, with the sub-network controller being programmed to transmit switch queries onto a communications sub-network of the switch module to each of a plurality of switch addresses to determine a connection status and switch state of a plurality of switches, receive switch messages from any switches on the communications sub-network associated with the switch addresses to which the switch queries were transmitted, identify a connection of a switch to the communications sub-network and its associated switch state based on the received switch messages, and control operation of a vehicle output or load associated with each of the plurality of switches based on the switch IDs and their associated switch states, wherein controlling operation of the vehicle output or load comprises at least one of transmitting the switch messages onto a vehicle communications bus to which the switch module is in operative communication, for purposes of controlling the vehicle output or load associated with the switch messages and controlling operation of one or more solid state outputs or relays associated with the switches from which the switch messages are provided.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE INVENTION

Embodiments of the invention are directed to a system and method that provides for a vehicle switch module having a self-identifying switch function. The switch module enables the placement of switches in any of a number of locations within a defined vehicle network consistent with a customer's desired switch customization requirement, while providing for the identification of a switch regardless of its location, such that switches can be placed in any position on the vehicle within that network without changing the switch's functionality or the system wiring.

Figure 1:
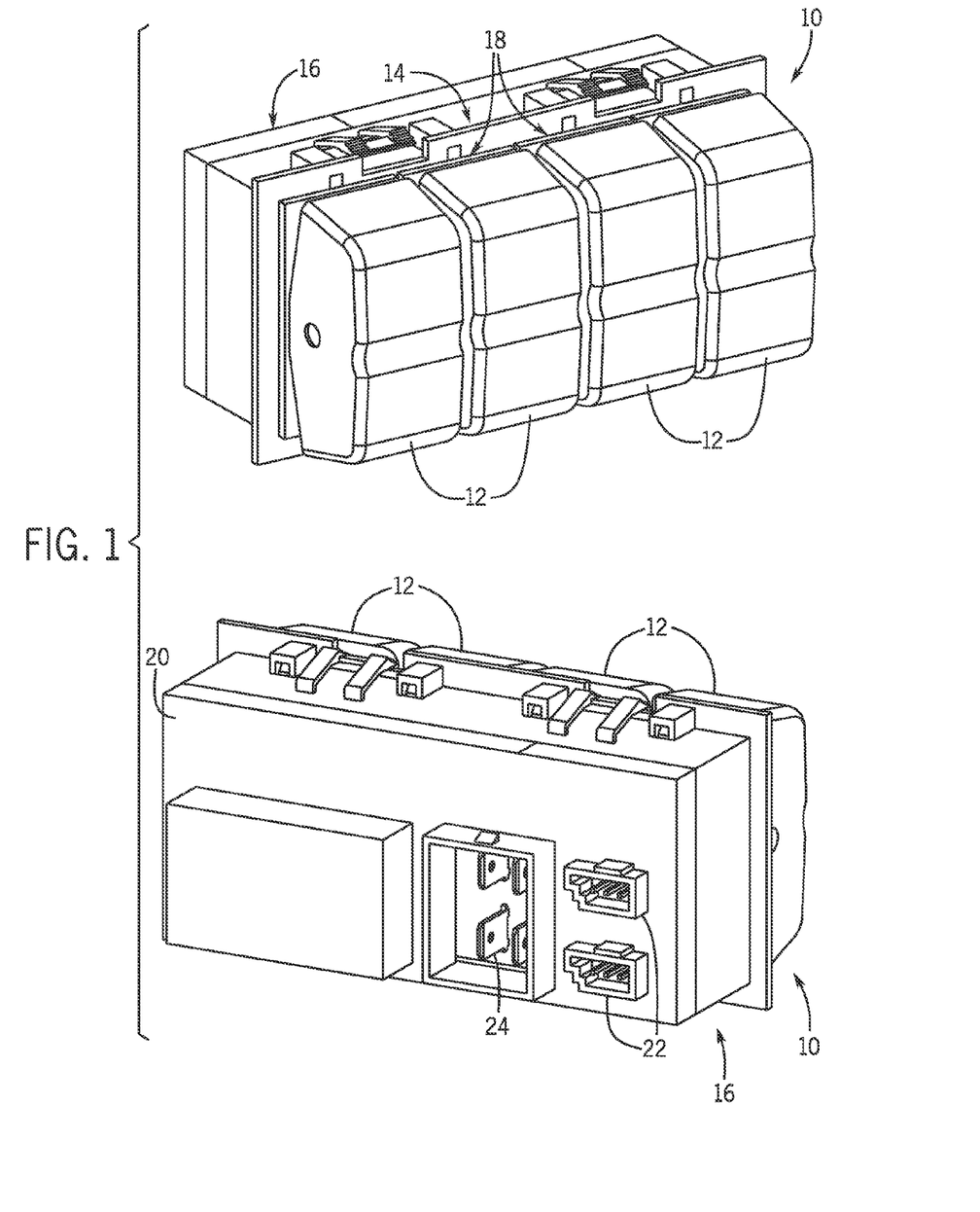
FIG. 1 shows front and rear views of a self-identifying vehicle switch module, according to an embodiment of the invention.

Referring to FIG. 1, the general structure of a self-identifying switch module 10 having a plurality of switches 12 is shown according to an embodiment of the invention. The switch module 10 is incorporated as part of a dashboard 14 in a motor vehicle, for example in a commercial vehicle, such as a goods vehicle. An operator of the vehicle uses the switches 12 to operate various functions in the vehicle, such as for switching the motor vehicle lighting, the windshield wipers, the diesel fuel heating, or other specialized equipment on the vehicle. In the embodiment illustrated in FIG. 1, the switch module 10 comprises four switches 12; however, it is recognized that a greater or smaller number of switches 12 could be included in the module. For example, a switch module 10 could be provided having eight switches 12—arranged in a single row or in two rows of four, for example. While there is no limit on the number of switches 12 that can be included in switch module 10, it is recognized that for practical purposes—such as responsiveness and speed of switch functioning—the number of switches 12 in an individual module 10 will be limited to a reasonable number so as to maintain a minimum level of vehicle performance.

As further shown in FIG. 1, the switches 12 of switch module 10 are received within a module housing 16 that is fitted in the dashboard 14 of the motor vehicle. The housing 16 is formed as a generally hollow member configured to receive the individual switches 12 therein and includes mating features formed thereon, such as alignment tabs or slots 18, which enable mating of the switches 12 within the housing 16 in the correct orientation. A back surface 20 of the switch module 10 includes communication ports 22 and a power receptacle 24 formed thereon for enabling powering of the module and communication to/from the module. The communication ports 22 are configured to mate with a communication interface feature (not shown), such as a pin-connector, so as to enable the switch module 10 to communicate with a communication bus of the vehicle, such as a CAN or LIN bus, for example.

Figure 2:
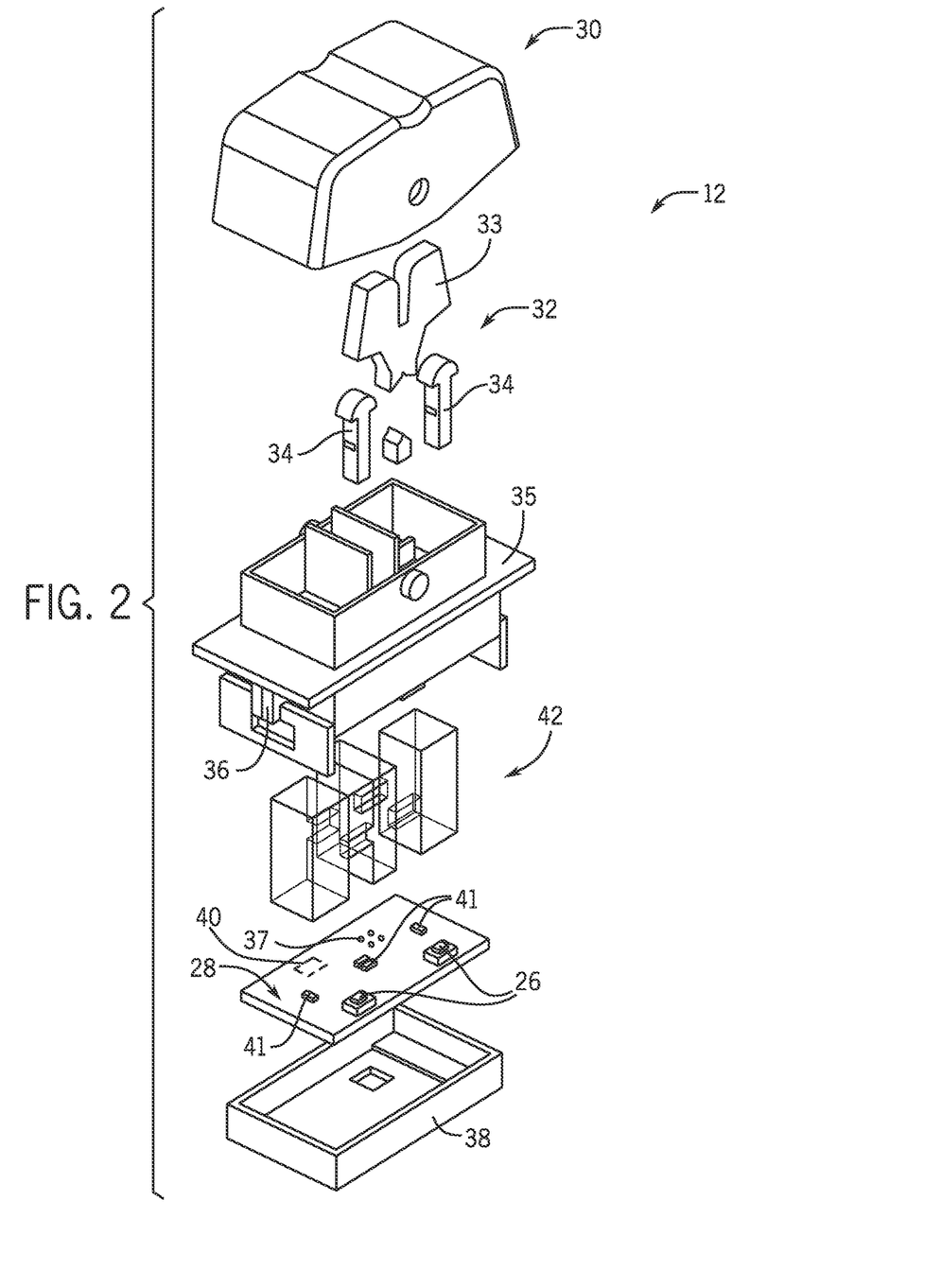
FIG. 2 is an exploded view of a switch included in the switch module of FIG. 1, according to an embodiment of the invention.

Referring now to FIG. 2, an exploded view of an individual switch 12 is shown in more detail. The switch 12 contains at least one operable contact 26, with two being shown preferentially in FIG. 2 in the form of tactile switches 26 affixed to a printed circuit board (PCB) 28. Other contact types, such as metal domes or carbon pills may be employed, but is not limited to those types. An operating member 30 that, according to an exemplary embodiment, is in the form of a rocker button is used to activate the switch contacts 26 by means of an actuator system 32. The actuator system 32 is shown in this embodiment to be comprised of a rocking actuator 33 and a set of one or two pushrods 34 to convert the rotational movement of the rocker 30 to a vertical displacement. The pushrods 34 act upon the contacts 26 to provide the switching signal. A switch frame 35 serves to enclose the PCB 36 and actuator system 32 and to affix the rocker 30 to the switch 12. The frame 35 also provides keying and retention features 36 formed thereon and arranged to ensure the correct orientation and retention of the switch 12 within the module housing 16 and to ensure proper alignment and mating of electrical connections.

In operation of switch 12, the rocker 30 is used in order to provide manual switching for the contacts 26 and actuator system 32. When the rocker 30 is in the neutral position, then the two contacts 26 and the actuator system 32 are in the switched-off state. If the user pushes one side of the rocker 30, the rocker 30 is moved to a first, operated switch position and, in consequence, a first of the contacts 26 and the actuator system 32 is moved to a switched-on state. In a second, operated position of the rocker 30, which is reached by pushing the other side of the rocker 30, a second of the contacts 26 is then in a switched-on state. The contacts 26, when in a switched-on state, communicate a desired activation of device(s) associated with the switch 12 via electrical connections formed on the PCB 28 of the switch 12. That is, signals from the switch 12 can be communicated out to the switch module 10 via a electrical/communications connection 37, such as a pin-connector formed on the PCB 28 that extends through an opening formed in a rear plate 38 of the switch 12.

Also included in switch 12 is a microprocessor 40 (shown in phantom) that is programmed to include and provide data on the switch 12 to the switch module 10. More specifically, processor 40 is programmed to have stored thereon address or ID information and functional data for the switch. Each switch 12 contains a unique address/ID associated with the switch function, with this unique address/ID data being programmed onto and stored in the processor 40. In practice, this unique address/ID would be programmed into the switch (on processor 40) prior to installation at an OEM facility.

In addition, the switches 12 contain light emitting diodes (LEDs) 41 located on the PCB 28 to provide illumination of graphic icons on the rockers 30 to identify the switch function and additionally to provide a visual indication of the switch state to the user. The light from the LEDs 41 is conducted through the frame 35 to the rocker 30 by means of one or more light pipes 42. The brightness of the LEDs 41 is controlled via LIN or CAN messages from the vehicle ECU to the switches 12.

Figure 3:
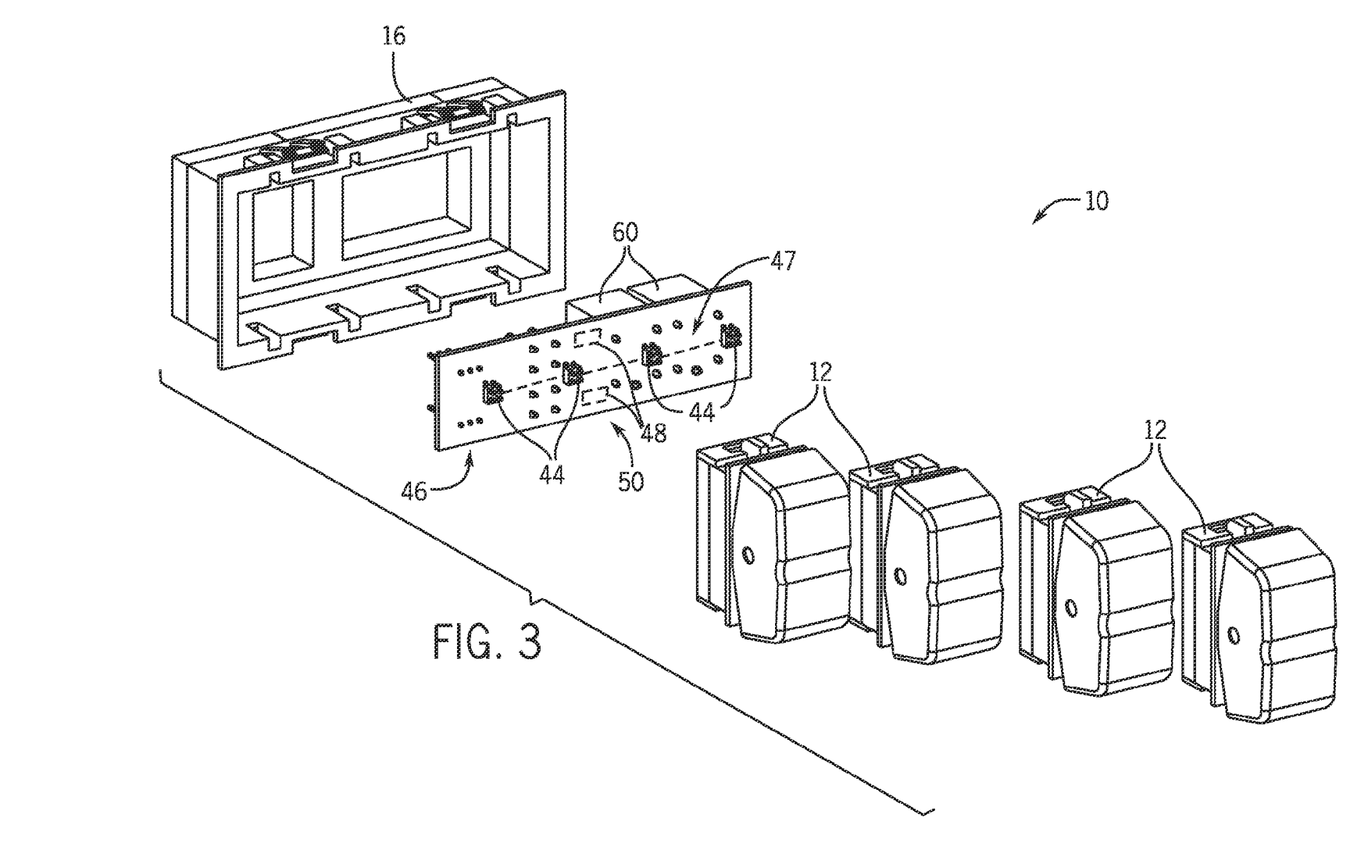
FIG. 3 is an exploded view of the switch module of FIG. 1, illustrating a backplane and sub-network controller of the switch module, according to an embodiment of the invention.

Referring now to FIG. 3, and with continued reference to FIG. 2, a mounting of the switches 12 within the switch module 10 is best shown. In plugging the switches into the switch module 10, communications connections 37 (FIG. 2) on the switches 12 are connected to communications connections 44 (e.g., pin connectors) formed on a backplane assembly 46 of the switch module 10, such that the switches 12 are in operative communication with the backplane assembly 46. The communications connections 44 formed on a backplane assembly 46 are collectively grouped onto a switch sub-node or sub-network 47 for the switch module 10. Also included on backplane assembly 46 are one or more microprocessors 48 that are collectively form what is referred to as a "sub-network controller" 50 of the switch module 10. The microprocessors 48 of the sub-network controller 50 function to communicate with both the vehicle communication bus and the switches 12 connected to backplane assembly 46 via the switch sub-network 47.

Also included within the module 10 as an additional embodiment are one or more network addressable relays (or solid state output devices) 60. The relays 60 provide higher current switching outputs for direct-wire applications and are controlled by the appropriate switch 12 via CAN or LIN bus signal.

Figure 4:
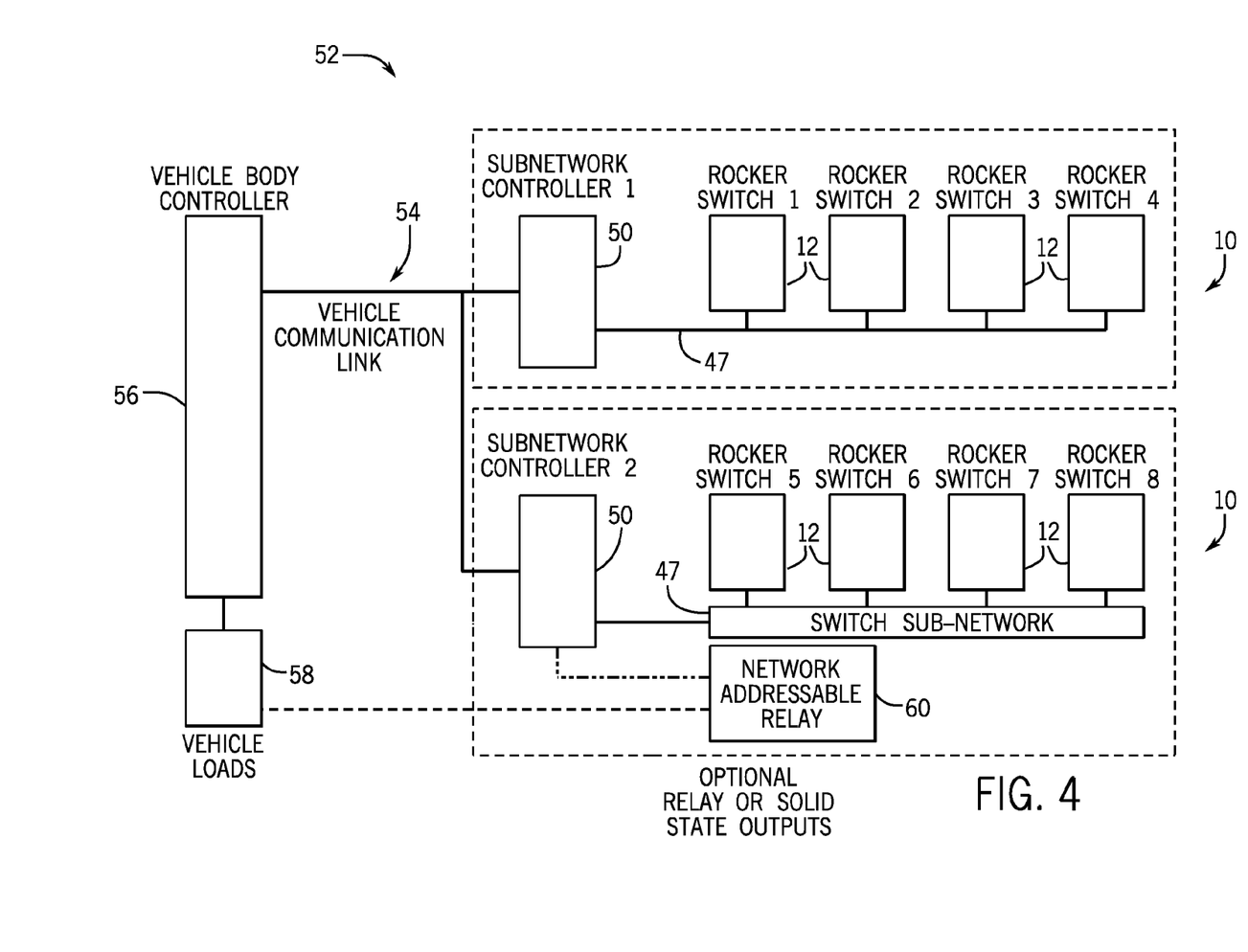
FIG. 4 is a schematic block diagram of a vehicle communication system that includes a plurality of self-identifying vehicle switch modules, according to an embodiment of the invention.

FIG. 4 provides a schematic diagram of a vehicle communication system 52 according to an embodiment of the invention and shows a pair of switch modules 10—such as shown and described in FIGS. 1-3—operatively connected to and in communication with a vehicle communication network or link 54, such as a CAN bus or LIN bus, for example. The vehicle communication system 52 provides for communication between the switches 12 in switch modules 10 and a vehicle body controller 56 (i.e., CAN/LIN master controller)—via communication link 54—with the vehicle body controller 56 interpreting data/signals received from the switch modules 10 to manage the associated vehicle functions, i.e., controlling of a vehicle load 58. The vehicle communication system 52 also provides for communication between the switch sub-network 47 and one or more relays, solid state relays (SSRs), or other solid state outputs 60 (referred to generally hereafter as "relays"—but recognizing that this encompasses relays, SSRs and/or other solid state outputs) that can supply current to a specific load as part of the switch module 10.

According to embodiments of the invention, the switch modules 10 can operate within vehicle communication system 52 to identify the presence of a particular switch 12 and the switch's state—with the sub-network controller 50 of the module performing a "self-identifying" function to associate an individual identification to each switch in the module. Thus, as indicated in FIG. 4 for example, any of "Rocker Switch 1" thru "Rocker Switch 8" could be individually identified to associate an individual identification to each switch and a state of each switch. As indicated previously, each switch 12 contains a unique address associated with the switch function, with such address information being stored in a microprocessor 40 included in the switch 12. The sub-network controller 50 of the switch module 10 contains logic recognizing each individual switch address. In communications between the switch 12 and the sub-network controller 50, switch state messaging would contain at minimum the switch's address as well as the switch's logic state, and the sub-network controller 50 would interpret the switch messages and turn on the associated output (such as via relay 60) or send a message to the vehicle body controller 56. Thus, messages on both the switch sub-network 47 and the vehicle communication link 54 would contain at minimum the switch address as well as the switch state.

Because each switch contains a unique address and the sub-network controller 50 contains the logic for the outputs, an OEM can place a switch 12 in any position on a vehicle without changing the switch's functionality. For example, swapping the positions of "Rocker Switch 2" with "Rocker Switch 7" would have no effect on the switches' functionality or the associated system/module wiring. Regardless of the location of Rocker Switch 2, for example, the sub-network controller 50 would recognize that Rocker Switch 2 is on the sub-network 47 and would relay that information to the vehicle communication link 54 and turn on the appropriate output device/load—as it applies—either by way of the vehicle's body controller 56 or by way of a relay 60 local to the switch module.

Figure 5:
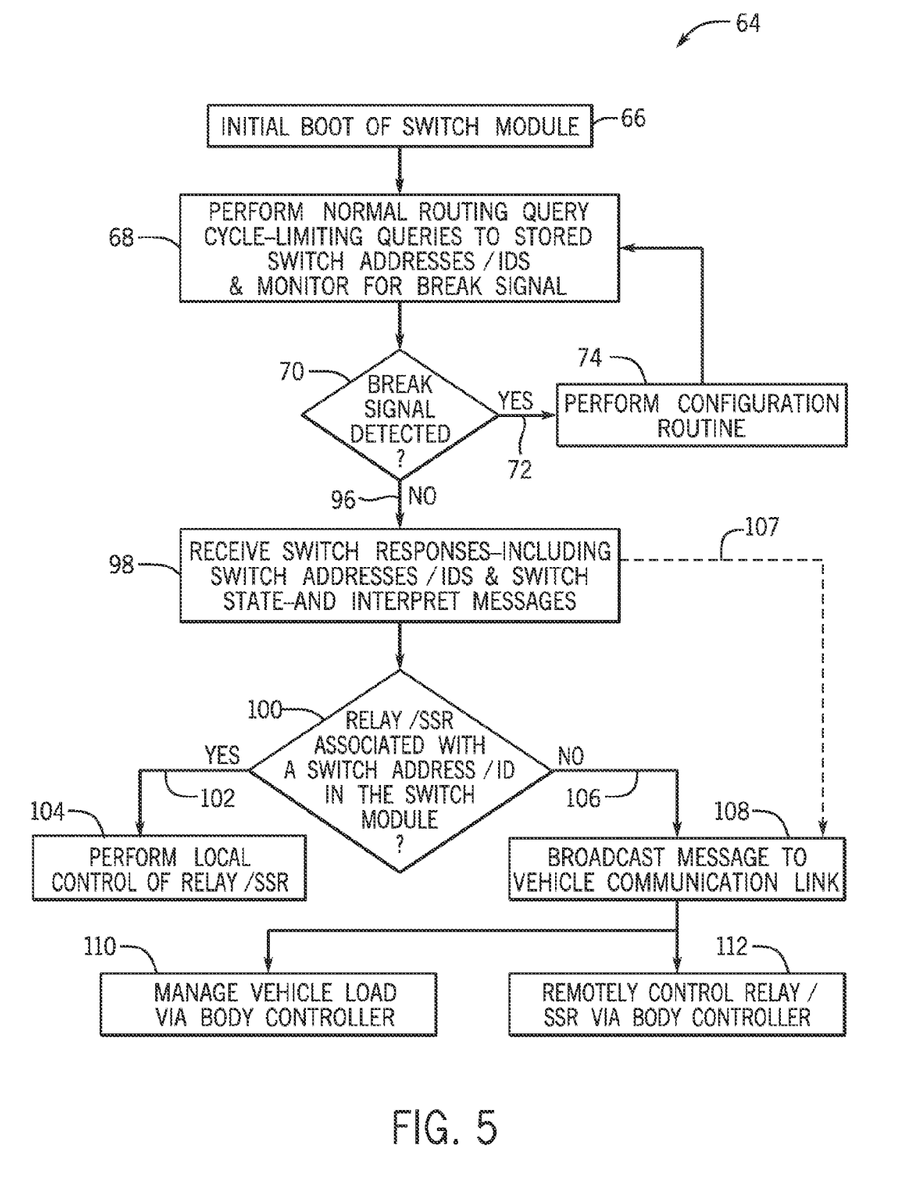
FIG. 5 is a flowchart illustrating a communications protocol technique implemented by a switch module of a vehicle communication system, according to an embodiment of the invention.

A communications protocol technique by which the switch modules 10 in vehicle communication system 52 identify a particular switch 12 included therein and interprets messages therefrom to turn on an associated output or send a message to the vehicle body controller 56 is illustrated in the flowchart of FIG. 5, according to an exemplary embodiment of the invention. Referring to FIG. 5, and with continued reference back to FIGS. 1-4, for each switch module 10, the technique 64 begins with an initial boot of the switch module at STEP 66. Upon booting of the switch module, the technique continues at STEP 68 where the sub-network controller 50 performs a "normal" operational mode query cycle of the switches 12 believed to be in the switch module 10. In the normal mode of operation, the sub-network controller 50 sends a series of queries to switches corresponding to a switch configuration stored in the sub-network controller 50 (i.e., stored in processors 48 and associated memory). In performing the normal operational mode query cycle, the sub-network controller 50 sends a first query onto its respective sub-network 47 to an individual switch 12 by sending a message to a particular address (or containing a particular ID byte) of a switch believed to be connected to the sub-network 47 and included in the switch module 10. The query to the switch requests information therefrom and can also include one or more commands therein, with a switch status request, LED on/off commands, and a dimmer level command being included in the query, for example. The individual switch 12 to which the query was sent will respond to the query by sharing its unique address/ID and switch state—assuming the switch is included in the switch module 10. The sub-network controller 50 then interprets the switch response and subsequently either broadcasts the data on the vehicle communication link 54 or sends commands to a relay associated with the specific switch—with such broadcasts being performed at a periodic rate. A similar querying as described above is performed/repeated for each of the other switches 12 believed to be included in the switch module 10 (i.e., the switches included in the current switch configuration stored in sub-network controller 50), with the sub-network controller 50 changing/incrementing the particular address to which the subsequent queries are sent such that queries are sent to all switches 12.

Also at STEP 68, and during the normal operational mode query cycle of the switches 12 by sub-network controller 50, a monitoring is performed to determine if a "roll call request" message or signal is received by the sub-network controller 50 during the querying of the switches 12 that indicates a need to determine which switches 12 are present in the switch module 10. According to an exemplary embodiment of the invention, the roll call request message is in the form of a "break signal" that is generated/transmitted by a microprocessor 40 included in each respective switch 12. The break signal is characterized as a dominant signal (e.g., a signal having a size/length of 1 byte or larger) as compared to other normal switch messages/signals generated by the switch 12. For generating such a break signal, the microprocessor 40 in each respective switch 12 contains logic that determines to send a break signal onto the sub-network 47 to the sub-network controller 50 if the switch processor 40 has not received a query from the sub-network controller 50 in a given amount of time. While generation and transmission of a break signal is discussed hereafter, it is recognized that the roll call request message/signal could take another form, such as specific data packet provided in a switch message designating the need for determining which switches 12 are present in the switch module 10.

In practice, a break signal will be generated by a microprocessor 40 in a respective switch 12 when a switch included in switch module 10 does not match with or correspond to the switches believed to be present in the switch module. That is, if the switches 12 included in switch module 10 do not correspond to those switches included in the switch configuration stored in memory of the sub-network controller 50, then a break signal will be generated by the microprocessor(s) 40 of a switch or switches 12 that are not included in the switch configuration stored in memory of the sub-network controller 50—as those switches would not receive a query signal from the sub-network controller 50 during the normal operational mode query cycle currently being performed.

In monitoring for the presence of a break signal, a determination is thus made at STEP 70 as to whether a break signal has been detected by sub-network controller 50 at any point during the normal operational query cycle. If it is determined at STEP 70 that a break signal has been detected, as indicated at 72, the technique 64 continues by entering into a "configuration routine" at STEP 74 where the sub-network controller 50 of the switch module 10 operates to determine the ID/address of switches that are present in the switch module, in effect taking a "roll call" to determine which switches 12 are included in the module 10. The performing of the configuration routine 74 is shown in detail in FIG. 6, with the routine starting at STEP 75 by way of the sub-network controller 50 accessing a "master list" pre-programmed/stored in the controller of switch addresses/IDs of all potential switches 12 that might be present in the switch module 10—with an example being provided with reference to FIG. 4 where the sub-network controller 50 in each module 10 would have programmed/stored thereon a listing of addresses corresponding to Rocker Switch 1 thru Rocker Switch 8 that may be present on its respective module 10. It is recognized that the list of all potential switches 12 (and associated addresses) that might be present in the switch module 10 that is pre-programmed/stored in the sub-network controller 50 would likely be much larger than eight switches/addresses, as in practice the list could be include up to 255 switches/addresses, for example. At STEP 76, the sub-network controller 50 sends a switch query message to a first potential/available switch address or ID included in the pre-programmed master switch list.

Figure 6:
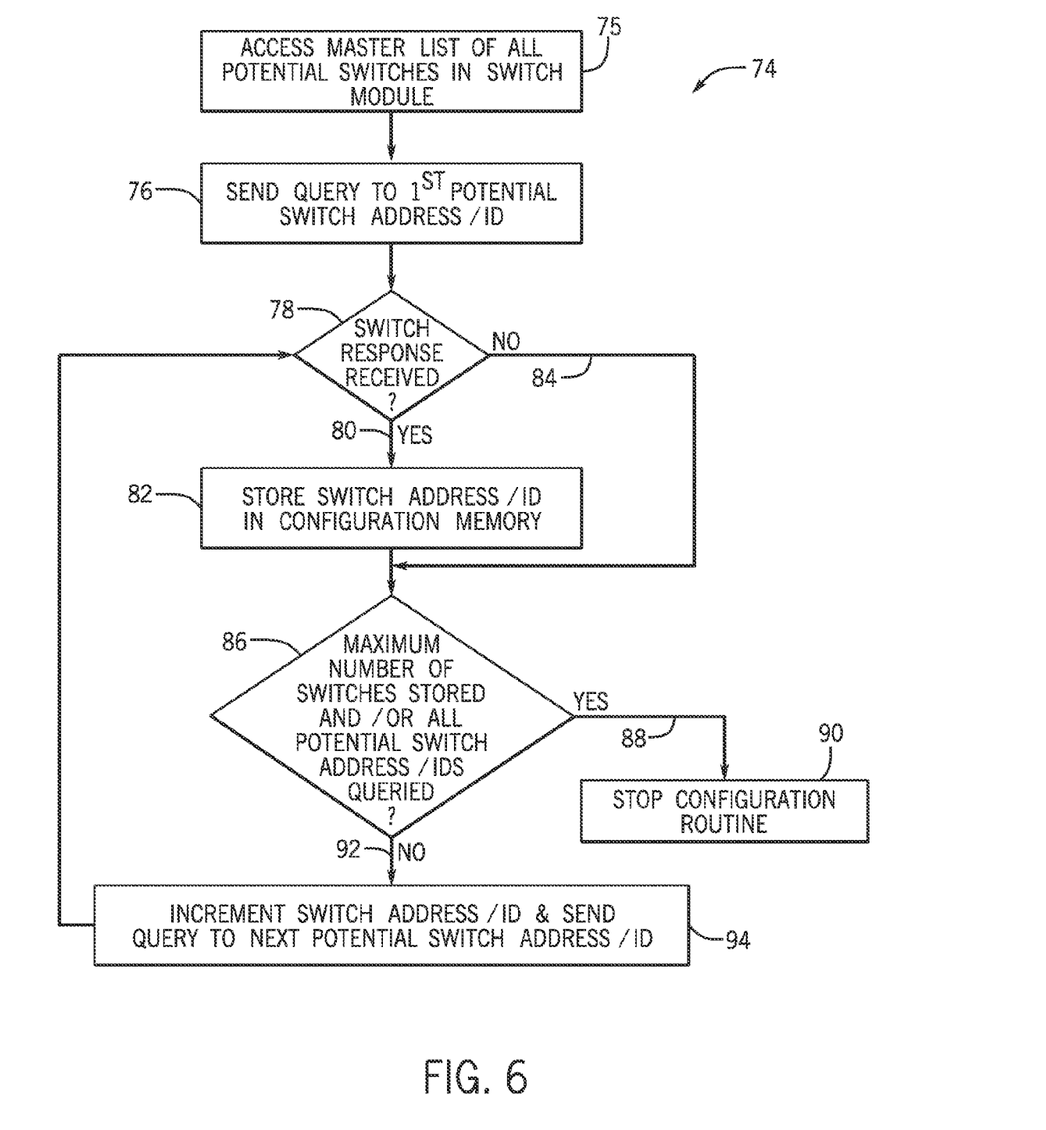
FIG. 6 is a flowchart illustrating a switch module configuration routine according to an embodiment of the invention.

At STEP 78, a determination is made as to whether a switch response is received by the sub-network controller 50—i.e., whether there is a switch 12 on the sub-network 47 of the switch module 10 having a first address/ID matching the first switch address/ID to which the query from the sub-network controller 50 was sent. If there is a switch 12 having such a first address/ID, the sub-network controller 50 will receive a switch response, as indicated at 80, and will then function to store the switch address/ID in its "configuration memory" at STEP 82, such that sub-network controller 50 will subsequently function to send a query to the switch 12 having the first address/ID during the normal operational mode query cycle. Alternatively, if no switch response is received by the sub-network controller 50 responsive to the query sent to the first switch address/ID, as indicated at 84, the sub-network controller 50 will recognize that no switch is included in the module 10 having that address/ID, and thus will not store anything in its "configuration memory" regarding the first address/ID.

After completing the first query, the configuration routine 74 continues at STEP 86 with the sub-network controller 50 making a determination as to whether a maximum number of allowed switch addresses/IDs have been stored in the configuration memory or whether queries have been sent to all potential switch addresses/IDs in the master list of addresses/IDs. With respect to the criteria included in STEP 86 regarding a determination whether a maximum number of allowed switch addresses/IDs have been stored in the configuration memory, an illustrative example is where switch module 10 has four switches 12 included therein and sub-network controller 50 compares the number of confirmed switch addresses/IDs stored in its configuration memory to the number of switches to see if a maximum number of allowed switch addresses/IDs have been stored in the configuration memory. That is, the sub-network controller 50 determines if a maximum number of allowed switch addresses/IDs—four in this example—have been stored in the configuration memory. With respect to the criteria included in STEP 86 regarding a determination of whether queries have been sent to all potential switch addresses/IDs in the master list of addresses/IDs, an illustrative example is where the sub-network controller 50 has a master list of 255 switch addresses/IDs pre-programmed thereon for switches that might potentially be included in the switch module 10. The sub-network controller 50 determines if queries have been sent to all of the 255 separate switch addresses/IDs corresponding to these switches.

As shown in FIG. 6, if a determination is made at STEP 86 that a maximum number of allowed switch addresses/IDs have been stored in the configuration memory and/or that queries have been sent to all potential switch addresses/IDs, as indicated at 88, then the configuration routine 74 would end at STEP 90—as it will have been determined that the "roll call" process implemented for determining which switches 12 are connected/included in switch module 10 has been completed, either based on the fact that all switches 12 included in the module 10 (and their associated switch addresses/IDs) have already been identified and stored in the configuration memory and/or based on the fact that all switch queries have already been sent. It is recognized that—by including as a stopping criteria a determination of whether switch queries have been sent to all potential addresses/IDs—a situation is covered where a switch module 10 is only partially populated (e.g., only five switches 12 are included in a switch module 10/backplane 46 capable of housing eight switches). The sub-network controller 50 would be able to recognize such an occurrence and properly terminate the configuration routine 74, without endlessly continuing the routine while attempting to fill the configuration memory with a maximum number of allowable switch addresses/IDs.

Conversely, if a determination is made at STEP 86 that a maximum number of allowed switch addresses/IDs have not been stored in the configuration memory and/or that queries have not yet been sent to all potential switch addresses/IDs, as indicated at 92, then the configuration routine 74 would continue. In practice, it is recognized that the routine 74 would always continue after the querying of only a single potential switch—i.e., after sending a query only to a first switch address/ID—but that the determination at STEP 86 would become relevant after a plurality or queries have been sent out to differing addresses/IDs.

As shown in FIG. 6, upon the determination 92, the configuration routine continues at STEP 94 by way of the sub-network controller 50 sending a switch query message to a next potential/available switch address or ID. In doing so, the sub-network controller 50 would increment the switch address/ID to a next known address/ID of a potential switch 12 that might be present in the switch module 10 (as determined known by a pre-programmed switch list or roster stored on the controller) and send another query message to that next address/ID—such as, for example, incrementing from an address/ID of Rocker Switch 1 to an address/ID of Rocker Switch 2.

Upon sending a switch query message to the next potential/available switch address or ID at STEP 94, the configuration routine 74 loops back to STEP 78, where a determination is made as to whether a switch response is received by the sub-network controller 50—i.e., whether there is a switch 12 on the sub-network 47 of the switch module 10 having a switch address/ID matching the next switch address/ID to which the query from the sub-network controller 50 was sent. The configuration routine 74 would continue thru the previously described steps until a determination is made at STEP 86 that a maximum number of allowed switch addresses/IDs have been stored in the configuration memory and/or that queries have been sent to all potential switch addresses/IDs (as indicated at 88)—with the configuration routine 74 then ending at STEP 90. Upon completion of the configuration routine 74, the sub-network controller 50 would return back to/resume a "normal" mode of operation. Thus, referring back to FIG. 5, upon completion of the configuration routine at STEP 74, the technique would loop back to STEP 68 and perform a normal operational query cycle of the switches 12 as described previously above—with the sub-network controller 50 limiting the queries to the addresses/IDs identified in the configuration routine and stored in the configuration memory of the sub-network controller, so as to maximize the module's throughput.

While the above described configuration routine 74 has been described as being implemented responsive to generation/transmission of a break signal from microprocessor 40 in switch 12—and the subsequent detection/reception thereof by the sub-network controller 50—it is recognized that an alternate embodiment of the invention is envisioned where sub-network controller 50 is self-aware as to whether the configuration routine 74 needs to be run. That is, sub-network controller 50 can be programmed to initiate the "roll call" associated with configuration routine 74—such as by the sub-network controller 50 determining that no configuration memory is stored therein upon an initial boot-up of the switch module 10.

Referring back now to FIG. 5, if a determination is made at STEP 70 that no break signal has been detected by the sub-network controller 50 during the normal operational mode query cycle, as indicated at 96, (absent or including a previous performing of the configuration routine 74) the technique 64 proceeds with the sub-network controller 50 continuing its "normal" operational mode. That is, at STEP 98, the sub-network controller 50 will receive individual responses from each of the switches 12 responsive to the switch status queries sent thereto and interpret the received switch messages. The response from each of the switches 12 to sub-network controller 50 will include therein data sharing its address/ID and switch state—thereby enabling the sub-network controller 50 to subsequently broadcast the switch message onto the vehicle communications network 54 for purposes of controlling vehicle outputs/loads 58 associated with the switch messages and/or to implement a local or remote control of one or more solid state outputs or relays associated with the switches 12 from which the switch messages are provided.

Upon receipt/interpreting of a switch message, a determination is made by the sub-network controller 50 at STEP 100 as to whether the message from the respective switch 12 should be used to directly turn on the associated output/load connected directly to the sub-network controller 50—via a local control of relay 60 (FIG. 4)—or instead whether the sub-network controller 50 should send a message to the vehicle body controller 56. Thus, at STEP 100 a determination is first made as to whether a relay 60 is associated with a particular switch 12 included in a switch module 10, as it is recognized that a relay 60 would have a fixed output for its pre-determined function—i.e., the relay function would be assigned to a particular switch address/ID.

If it is determined that a relay 60 is associated with a particular switch 12 from which the sub-network controller 50 is receiving a switch message response (i.e., a switch message response received by sub-network controller 50 includes an address/ID corresponding to the switch 12 associated with the relay 60), as indicated at 102, the technique 64 continues at STEP 104 where the sub-network controller 50 would implement a "local control" of the relay 60. That is, the sub-network controller 50—upon receiving a switch address/ID and switch status from the switch 12 associated with the relay 60—functions to energize and de-energize the specific relay 60 accordingly. If the sub-network controller 50 receives a switch address/ID from the switch 12 associated with the relay 60 but no switch status, the sub-network controller 50 will not command the relay. Thus, rather than broadcasting to vehicle communication link 54 and body/master controller 56, it is recognized that the switch modules 10 enable communication directly between a switch 12 and an associated relay 60—regardless of the exact location of the switch 12.

Beneficially, the sub-network controllers 50 of switch modules 10 enable this "local" control of the relays 60 even if switches 12 are swapped to a different module 10 and associated sub-network 47. That is, the sub-network controllers 50 are programmed such that they may energize/de-energize the relays 60 either by the sub-network message generated locally or alternatively by a vehicle network message generated by the sub-network controller containing the switch 12. As such, if the switch 12 is moved to a switch module 10 not directly coupled to the relay 60 associated with that switch, the relay 60 can still be controlled via a vehicle network message generated by the sub-network controller 50.

If it is determined at STEP 100 that no relay 60 is associated with a particular switch 12 in the module from which the sub-network controller 50 is receiving a switch message response, as indicated at 106, or if instead the determination at STEP 100 is bypassed, as indicated in phantom at 107, the technique 64 continues at STEP 108 where the sub-network controller 50 functions to broadcast the switch message received from each particular switch 12 in its switch module 10 to the vehicle communication network 54. Once broadcast to the vehicle communication network 54, messages from sub-network controller 50 will be received by the vehicle body controller 56, such that the vehicle body controller 56 can interpret the message and cause a desired action to be performed. As shown in FIG. 5, depending on the message received from sub-network controller 50, the vehicle body controller 56 may either act to manage (e.g., turn-on or turn-off) a specified vehicle function/load or to remotely control a relay 60 in the vehicle.

In managing a specified vehicle function/load, the vehicle body controller 56 acts to control the vehicle function or load associated with a particular received message and the switch address/ID and switch state/function included therein, as indicated at STEP 110. The vehicle body controller 56 transmits a message to the vehicle function/load, so as to cause the vehicle function/load to operate in a desired manner—such as sending a message to cause windshield wipers to turn-on.

In remotely controlling a relay 60 in the vehicle, the vehicle body controller 56 acts to send a vehicle sub-network command to turn on a relay 60 associated with a particular received message and the switch address/ID and switch state/function included therein, as indicated at STEP 112. The sub-network controller(s) 50 in the communication system 52 thus would not link to a specific relay 60, but rather the vehicle body controller 56 would command the relay(s) 60 via sub-network commands—with such commands being pre-defined for operator use. In implementing a remote relay control, a customer will have the option of controlling the relays/SSRs remotely by either sending a configuration message at the sub-network controller 50 or by having it hard-coded into memory.

Thus, as described above in FIGS. 5 and 6, the communications protocol technique 64 (and the configuration routine 74 performed therein) performed by the sub-network controller 50 of respective switch modules 10 provides a "self-identifying" function that associates an individual identification to each switch in a module. With the configuration routine 74 described above, an OEM can change switch locations in the communication system 52 without a change in functionality. If someone relocates a switch 12 on the same backplane 46 within a switch module 10, there would be no change in configuration on the sub-network controller 50, as the sub-network controller 50 would still identify the switch as part of its normal operational mode query cycle. Alternatively, if someone moves a switch 12 from a backplane 46 in a first switch module 10 to a backplane 46 in a second/different switch module 10, the configuration routine performed by the sub-network controller 50 would still enable identification of the switch in its new module. That is, the switch 12 newly installed in a different switch module 10 would not receive a query from its associated sub-network controller 50 as part of that controller's normal operational mode query cycle—but the transmitting of a break signal via the switch's processor logic would initialize the configuration routine such that the newly placed switch is properly identified by the sub-network controller 50 upon completion of the configuration routine, such that the sub-network controller 50 would have stored the new switch configuration and resume normal operation, subsequently including the new switch in its normal query routine.

Beneficially, embodiments of the invention thus provide a self-identifying switch module 10 that allows customers to change the location of switches without rewiring their communication system. The self-identifying switch module 10 is able to identify switches regardless of their location, doing so in a timely fashion by employing a switch query logic that employs a normal operational mode and a configuration mode and by storing a switch configuration in its memory—so as to not slow down throughput. The communication system also contains relays, solid state relays (SSRs) and/or other solid state outputs that can supply current directly to a load, similar to a traditional switch, with the self-identifying switch module 10 able to operate with local relay control, remote relay control and/or a combination of both. The self-identifying switch module 10 allows vehicle OEMs to significantly reduce the cost of managing a custom dash board by allowing for one vehicle harness that could handle multiple customer options, reducing the engineering overhead and the wire count associated with a custom dashboard.

A technical contribution for the disclosed method and apparatus is that it provides for a controller implemented technique for self-identifying switches within a defined vehicle communication network. A sub-network controller within a switch module on the vehicle communication network performs a querying operation to identify each particular switch included in the switch module of a switch regardless of its location, such that switches can be placed in any position/module on the vehicle within that network without changing the switch's functionality or the system wiring, such a customer's desired switch customization requirement can be met.

Therefore, according to one embodiment of the present invention, an electrical switch module for use in a motor vehicle includes a backplane includes a plurality of connections thereon and a communications sub-network, a sub-network controller in operative communication with the communications sub-network, and a plurality of electrical switches coupled to the plurality of connections on the backplane so as to be in operative communication with the communications sub-network, each of the plurality of electrical switches including a microprocessor therein programmed to generate switch messages that include therein data regarding an address associated with the switch and a switch logic state. The sub-network controller is programmed to transmit switch queries onto the communications sub-network to each of a plurality of switch addresses to determine a connection status and switch state of the plurality of electrical switches and receive switch messages responsive to the switch queries from switches at the switch addresses to which the switch queries were transmitted, with each of the received switch messages verifying the presence of a switch in the switch module and providing a switch state for the respective switch. The sub-network controller is further programmed to interpret the received switch messages to perform at least one of transmitting the switch messages onto a vehicle communications network to which the switch module is in operative communication, for purposes of controlling vehicle outputs associated with the switch messages and controlling operation of one or more solid state outputs or relays associated with the switches from which the switch messages are provided.

According to another embodiment of the present invention, a method of identifying and transmitting switch messages to and from a switch module in a vehicle communication system includes associating a switch ID with each of a plurality of switches included in a vehicle communication system and identifying the switch ID of all switches included in a switch module in the vehicle communication system, such that each switch included in the switch module is identified by its switch ID. The method also includes identifying a switch state of all switches included in the switch module and controlling operation of a vehicle output or load associated with each of the plurality of switches based on the identified switch IDs and their associated switch states. The steps of identifying the switch ID and the switch state of switches included in the switch module further includes causing a sub-network controller of the switch module to transmit switch queries onto a sub-network of the switch module to each of a plurality of switch addresses, receiving at the sub-network controller switch messages from any switches on the sub-network that are associated with the switch IDs to which the switch queries were transmitted, and identifying the switch ID and the switch state of all switches in the switch module based on the received switch messages.

According to yet another embodiment of the present invention, a switch module sub-network controller for enabling vehicular communication between switches in a switch module and loads associated with the switches is provided, with the sub-network controller being programmed to transmit switch queries onto a communications sub-network of the switch module to each of a plurality of switch addresses to determine a connection status and switch state of a plurality of switches, receive switch messages from any switches on the communications sub-network associated with the switch addresses to which the switch queries were transmitted, identify a connection of a switch to the communications sub-network and its associated switch state based on the received switch messages, and control operation of a vehicle output or load associated with each of the plurality of switches based on the switch IDs and their associated switch states, wherein controlling operation of the vehicle output or load comprises at least one of transmitting the switch messages onto a vehicle communications bus to which the switch module is in operative communication, for purposes of controlling the vehicle output or load associated with the switch messages and controlling operation of one or more solid state outputs or relays associated with the switches from which the switch messages are provided.

The present invention has been described in terms of the preferred embodiment, and it is recognized that equivalents, alternatives, and modifications, aside from those expressly stated, are possible and within the scope of the appending claims.

What is claimed is:

1. An electrical switch module for use in a motor vehicle, the switch module comprising:
    a backplane comprising a plurality of connections thereon and a communications sub-network;
    a sub-network controller in operative communication with the communications sub-network; and
    a plurality of electrical switches coupled to the plurality of connections on the backplane so as to be in operative communication with the communications sub-network, each of the plurality of electrical switches including a microprocessor therein programmed to generate switch messages that include therein data regarding an address associated with the switch and a switch logic state;
    wherein the sub-network controller is programmed to:
        transmit switch queries onto the communications sub-network to each of a plurality of switch addresses to determine a connection status and switch state of the plurality of electrical switches;
        receive switch messages responsive to the switch queries from switches at the switch addresses to which the switch queries were transmitted, with each of the received switch messages verifying the presence of a switch in the switch module and providing a switch state for the respective switch; and
        interpret the received switch messages to perform at least one of:
            transmitting the switch messages onto a vehicle communications network to which the switch module is in operative communication, for purposes of controlling vehicle outputs associated with the switch messages; and
            controlling operation of one or more solid state outputs or relays associated with the switches from which the switch messages are provided.

2. The switch module of claim 1 wherein the sub-network controller is programmed to generate and store a configuration memory comprising a list of switch addresses of switches included in the switch module.

3. The switch module of claim 2 wherein the sub-network controller is programmed to transmit switch queries onto the communications sub-network according to a normal operational mode query cycle, with the sub-network controller transmitting switch queries only to the list of switch addresses stored in the configuration memory during normal operational mode query cycle.

4. The switch module of claim 3 wherein the microprocessor of each switch is programmed to transmit a roll call request onto the communications sub-network when no switch query is received from the sub-network controller within a pre-determined period of time.

5. The switch module of claim 4 wherein the sub-network controller is programmed to:
    receive a roll call request from a respective switch in the switch module; and
perform a configuration routine responsive to a received roll call request.

6. The switch module of claim 5 wherein, in performing the configuration routine, the sub-network controller is programmed to:
  access a master list of all switch addresses of potential switches that might be present in the switch module;
  transmit a switch query to each of a plurality of switch addresses included in the master list;
  receive switch messages from switches included in the switch module responsive to the switch queries; and
  for each switch message received from a switch in the switch module, store the switch address associated with that switch in the configuration memory, so as to update the list of switch addresses stored in the configuration memory.

7. The switch module of claim 6 wherein the sub-network controller is programmed to terminate the configuration routine upon one of:
  receiving a number of responses from switches that is equal to a number of switches included in the switch module; or
  transmitting switch queries to all of the switch addresses included in the master list.

8. The switch module of claim 7 wherein, upon termination of the configuration routine, the sub-network controller is programmed to transmit switch queries onto the communications sub-network according to the normal operational mode query cycle.

9. The switch module of claim 1 wherein, in controlling operation of one or more solid state outputs or relays associated with the switches from which the switch messages are provided, the sub-network controller is programmed to:
  associate switch addresses of switches in the switch module with the solid state outputs or relays; and
  locally control the one or more solid state outputs or relays, by directly energizing or de-energizing the one or more solid state outputs or relays, responsive to switch messages received via the communications sub-network or the vehicle communications network.

10. The switch module of claim 1 wherein the switch signals transmitted onto the vehicle communications network are provided to a vehicle body controller for controlling the vehicle outputs associated with the switch messages or for remotely controlling solid state outputs or relays associated with particular switches.

11. A method of identifying and transmitting switch messages to and from a switch module in a vehicle communication system, the method comprising:
  associating a switch ID with each of a plurality of switches included in a vehicle communication system;
  identifying the switch ID of all switches included in a switch module in the vehicle communication system, such that each switch included in the switch module is identified by its switch ID;
  identifying a switch state of all switches included in the switch module; and
  controlling operation of a vehicle output or load associated with each of the plurality of switches based on the identified switch IDs and their associated switch states;
  wherein identifying the switch ID and the switch state of switches included in the switch module further comprises:
    causing a sub-network controller of the switch module to transmit switch queries onto a sub-network of the switch module to each of a plurality of switch addresses;
    receiving, at the sub-network controller, switch messages from any switches on the sub-network that are associated with the switch IDs to which the switch queries were transmitted; and
    identifying the switch ID and the switch state of all switches in the switch module based on the received switch messages.

12. The method of claim 11 wherein identifying the switch ID of all switches included in the switch module further comprises generating and storing a configuration memory that includes switch IDs of all switches included in the switch module.

13. The method of claim 12 wherein identifying the switch ID and the switch state of switches included in the switch module further comprises transmitting switch queries onto the sub-network according to a normal operational mode query cycle, with the sub-network controller transmitting switch queries only to the list of switch IDs stored in the configuration memory during normal operational mode query cycle.

14. The method of claim 13 further comprising:
  causing a switch in the switch module to transmit a roll call request onto the sub-network when no switch query is received within a pre-determined period of time;
  receiving, at the sub-network controller, a roll call request from a respective switch in the switch module; and
  performing a configuration routine responsive to a received roll call request, wherein performing the configuration routine includes:
    accessing a master list of all switch IDs of potential switches that might be present in the switch module;
    transmitting a switch query to each of a plurality of switch IDs included in the master list;
    receiving switch messages from switches included in the switch module responsive to the switch queries; and
    for each switch message received from a switch in the switch module, storing the switch ID associated with that switch in the configuration memory, so as to update the switch IDs stored in the configuration memory.

15. The method of claim 14 wherein performing the configuration routine further includes terminating the configuration routine upon one of:
  receiving a number of responses from switches that is equal to a number of switches included in the switch module; or
  transmitting switch queries to all of the switch IDs included in the master list.

16. The method of claim 11 wherein controlling operation of a vehicle output or load comprises transmitting switch messages from the sub-network controller onto a vehicle communication bus to which the switch module is in operative communication, for purposes of controlling vehicle outputs associated with the switch messages.

17. The method of claim 11 wherein controlling operation of a vehicle output or load comprises:
  associating a switch ID of a respective switch with a solid state output or relay; and
  causing the sub-network controller to control operation of the solid state output or relay based on the message received by the sub-network controller from the respective switch that includes the switch ID and the switch state.

18. A switch module sub-network controller for enabling vehicular communication between switches in a switch module and loads associated with the switches, the sub-network controller being programmed to:
- transmit switch queries onto a communications sub-network of the switch module to each of a plurality of switch addresses to determine a connection status and switch state of a plurality of switches;
- receive switch messages from any switches on the communications sub-network associated with the switch addresses to which the switch queries were transmitted;
- identify a connection of a switch to the communications sub-network and its associated switch ID and switch state based on the received switch messages, each switch message including a switch ID therein that uniquely identifies the switch; and
- control operation of a vehicle output or load associated with each of the plurality of switches based on the switch IDs and their associated switch states, wherein controlling operation of the vehicle output or load comprises at least one of:
  - transmitting the switch messages onto a vehicle communications bus to which the switch module is in operative communication, for purposes of controlling the vehicle output or load associated with the switch messages; and
  - controlling operation of one or more solid state outputs or relays associated with the switches from which the switch messages are provided.

19. The sub-network controller of claim 18 wherein the sub-network controller is further programmed to:
- generate and store a configuration memory comprising a list of switch addresses of switches included in the switch module; and
- transmit switch queries onto the communications sub-network according to a normal operational mode query cycle, with the switch queries being transmitted only to the list of switch addresses stored in the configuration memory during normal operational mode query cycle.

20. The sub-network controller of claim 19 wherein the sub-network controller is further programmed to:
- receive a roll call request from a respective switch in the switch module, the roll call request being generated by the switch when no switch query is received thereby within a pre-determined period of time; and
- perform a configuration routine responsive to a received roll call request, wherein performing the configuration routine includes:
  - accessing a master list of all switch addresses of potential switches that might be present in the switch module;
  - transmitting a switch query to each of a plurality of switch addresses included in the master list;
  - receiving switch messages from switches included in the switch module responsive to the switch queries; and
  - for each switch message received from a switch in the switch module, storing the switch address associated with that switch in the configuration memory, so as to update the switch addresses stored in the configuration memory.

* * * * *